United States Patent
Gentric

(10) Patent No.: US 12,387,458 B2
(45) Date of Patent: Aug. 12, 2025

(54) METHOD FOR GENERATING AN AUGMENTED IMAGE AND ASSOCIATED DEVICE

(71) Applicant: IDEMIA IDENTITY & SECURITY FRANCE, Courbevoie (FR)

(72) Inventor: Stéphane Gentric, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 401 days.

(21) Appl. No.: 17/952,371

(22) Filed: Sep. 26, 2022

(65) Prior Publication Data

US 2023/0097143 A1 Mar. 30, 2023

(30) Foreign Application Priority Data

Sep. 27, 2021 (FR) ..................... 21 10146

(51) Int. Cl.
| | |
|---|---|
| *G06V 10/75* | (2022.01) |
| *G06T 7/00* | (2017.01) |
| *G06V 10/98* | (2022.01) |
| *G06V 40/10* | (2022.01) |
| *G06V 40/50* | (2022.01) |

(52) U.S. Cl.
CPC .......... *G06V 10/751* (2022.01); *G06T 7/0002* (2013.01); *G06V 10/98* (2022.01); *G06V 40/10* (2022.01); *G06V 40/50* (2022.01); *G06T 2207/20084* (2013.01); *G06T 2207/30168* (2013.01); *G06T 2207/30196* (2013.01)

(58) Field of Classification Search
CPC ...... G06V 10/751; G06V 10/98; G06V 40/10; G06V 40/50; G06V 10/40; G06V 10/82; G06V 10/993; G06V 40/16; G06V 40/40; G06V 40/15; G06T 7/0002; G06T 2207/20084; G06T 2207/30168; G06T 2207/30196; G06F 18/2414; G06F 18/00; G06F 21/32; G06N 3/02; H04L 63/0861; H04W 12/06
See application file for complete search history.

(56) References Cited

U.S. PATENT DOCUMENTS

| | | | |
|---|---|---|---|
| 2009/0228968 A1* | 9/2009 | Ting .................. | H04L 63/20 726/8 |
| 2022/0383663 A1* | 12/2022 | Gupta .................. | G06V 10/82 |

OTHER PUBLICATIONS

H. Demirel et al, "Automatic Segmentation of Training Set for Facial Feature Detection" 1997, International Conference on Information Communications and Signal Processing ICICS '97, pp. 984-989 (Year: 1997).*

* cited by examiner

*Primary Examiner* — David F Dunphy
(74) *Attorney, Agent, or Firm* — Oblon, McClelland, Maier & Neustadt, L.L.P.

(57) ABSTRACT

A method including: for each image forming part of a plurality of images showing an individual, applying processing to the image so as to produce a biometric template relating to the individual; calculating an average template constituting an average of the biometric templates produced; modifying a chosen image from the plurality of images into a modified image, the modification being adapted so that an error between the average template and a biometric template produced by applying the processing to the modified image is smaller than an error between the average template and the biometric template that has been produced by applying the processing to the chosen image.

10 Claims, 2 Drawing Sheets

METHOD FOR GENERATING AN AUGMENTED IMAGE AND ASSOCIATED DEVICE

FIELD OF THE INVENTION

The present invention relates to the field of biometrics.

More particularly, the present invention relates to a method comprising generating an augmented image from a plurality of images of an individual.

PRIOR ART

A known biometric authentication system comprises two devices: a first device comprising an image sensor for acquiring images, and a second device producing an authentication result, the first device and the second device communicating via a communication network.

A first method implemented in a system of this type is as follows: the image sensor acquires an image showing the individual. The image is transmitted to the second device via the communication network. The second device produces a biometric template based on the transmitted image. This biometric template may then be compared with reference templates stored in a database. If there is a match between the calculated biometric template and one of the reference templates, the individual is deemed to be an authorized user. However, this first method may lead to an erroneous result if the acquired image is noisy, in particular if the image is blurred or does not show a distinguishing part of the user's body accurately enough.

To overcome this problem, a second method has been proposed in which the image sensor acquires not just one but multiple images, and the processing implemented in the first method is applied to each image. However, this second method has a number of drawbacks: firstly, it consumes more bandwidth than the first method (specifically, multiple images are transmitted in the communication network instead of just one); secondly, it requires a greater computing load than the first method.

SUMMARY OF THE INVENTION

One object of the invention is to generate data relating to an individual on the basis of which biometric authentication may be performed reliably and with low bandwidth consumption during their transmission in a communication network.

To that end, according to a first aspect, a computer-implemented method is provided, the method comprising:
for each image forming part of a plurality of images showing an individual, applying processing to the image so as to produce a biometric template relating to the individual;
calculating an average template constituting an average of the biometric templates produced;
modifying a chosen image from the plurality of images into a modified image, the modification being adapted so that an error between the average template and another biometric template produced by applying the processing to the modified image is smaller than an error between the average template and the biometric template that has been produced by applying the processing to the chosen image.

First, the modified image condenses information from multiple images showing the individual into a smaller size, which reduces the likelihood of it being noisy. Second, applying the same processing to this image would produce a biometric template close to the average template, thereby providing a reliable basis for comparison with reference templates.

The method according to the first aspect may further comprise the following optional features, taken individually or in combination with one another when that is technically feasible.

Preferably, the chosen image is such that the biometric template produced by application of the chosen image is the closest to the average template from among the biometric templates produced.

Preferably, the modifying step is iterated until at least one of the following conditions is met:
an iteration of the modifying step has produced a final image such that an error between the average template and a biometric template produced by applying the processing to the final image is below a predefined threshold;
the number of iterations of the modifying step has reached a predefined threshold.

Preferably, the modifying step is iterated as follows:

$$I_{k+1}=I_k-\lambda*D_k$$

where:
$I_k$ is an image to be modified by a kth iteration of the modifying step;
$I_{k+1}$ is a modified image produced by the kth iteration;
$\lambda$ is a predefined parameter;
$D_k=\delta E_k/\delta I_k$, where $E_k$ is an error between the average template and a biometric template produced by applying the processing to the image $I_k$.

Preferably, the processing is implemented by a convolutional neural network.

Preferably, the method comprises selecting the plurality of images from a sequence of images, for example originating from a video of the individual.

Preferably, the plurality of images come from images acquired by a single image sensor.

Preferably, the selection is made on the basis of an image quality criterion and on the basis of a criterion of temporal location in the sequence of images.

Preferably, the selection comprises:
a) for each image from the sequence of images, calculating an associated metric indicative of a quality of the image;
b) selecting an image from the sequence of images whose associated metric indicates the best quality from a set of images from the sequence which have not yet been selected;
c) for at least one image from the sequence other than the selected image $I_0$ cated in a predefined temporal vicinity of the selected image, downgrading the metric associated with the image;
d) repeating steps b) and c) until at least one of the following conditions is met:
the number of implementations of step b) has reached a predefined threshold;
the metric for each image from the sequence of images which has not yet been selected has crossed a predefined quality threshold.

Preferably, the steps of the method are implemented by a first device, the method further comprising a step of transmitting, in a communication network and to a second device, a final image originating from the modified image, the second device being configured to apply the processing to the final image so as to produce a final biometric template relating to the individual.

There is also provided, according to a second aspect, a computer-readable memory storing instructions that are executable by the computer in order to carry out the steps of the method according to the first aspect.

There is also provided, according to a third aspect, a device comprising a sensor configured to acquire a plurality of images showing an individual, and at least one processor configured to:

for each image forming part of the plurality of images, apply processing to the image so as to produce a biometric template relating to the individual;

calculate an average template constituting an average of each biometric template produced;

modify a chosen image from the plurality of images into a modified image, the modification being adapted so that an error between the average template and a biometric template produced by applying the processing to the modified image is smaller than an error between the average template and the biometric template that has been produced by applying the processing to the chosen image.

DESCRIPTION OF THE FIGURES

Further features, objects and advantages of the invention will become apparent from the following description, which is purely illustrative and non-limiting and should be read in conjunction with the appended drawings, in which.

In all of the figures, elements that are similar bear the same reference numerals.

DETAILED DESCRIPTION OF THE INVENTION

Figure 1:
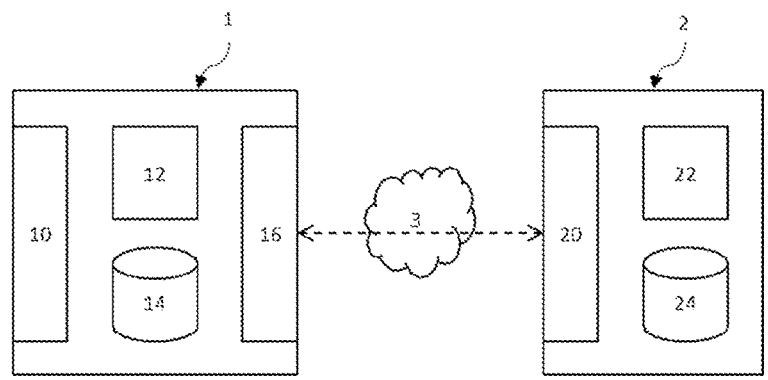
FIG. 1 schematically illustrates a biometric authentication system according to one embodiment of the invention.

With reference to FIG. 1, a biometric authentication system comprises a first device 1 and a second device 2 designed to communicate with one another via a communication network 3.

The first device 1 comprises an image sensor 10, a data processing unit 12, a memory 14 and a communication interface 16 with the second device 2.

The image sensor 10 is, for example, designed to acquire a video of an individual, i.e. a sequence of images showing an individual.

In this text, what is meant by an "image showing an individual" is an image that shows a part of the body of that individual, in particular a part of the body of the individual that allows the individual to be distinguished from another individual.

For example, the acquired images may show the face of the individual, or at least a fingerprint of the individual.

The data processing unit 12 is configured to apply certain processing operations to the images acquired by the image sensor 10.

In particular, the processing unit 12 is configured to implement a convolutional neural network which takes as input an image I and produces from this input image a biometric template T relating to the individual shown in the input image I. In the following, the processing applied by the convolutional neural network will be referred to as the CNN mathematical function. Therefore:

$$T = CNN(I)$$

The processing unit 12 typically comprises at least one processor for implementing the aforementioned processing operations, the or each processor potentially taking any form (ASIC, FPGA, SoC, microcontroller, etc.).

The first device 1 further comprises a memory which stores a computer program comprising code instructions that are executable by the or each processor. When the program is executed by the or each processor, a method comprising the aforementioned processing operations is implemented.

The memory typically comprises a volatile memory unit (RAM for example) and a non-volatile memory unit (flash, EEPROM, hard disk, SSD, etc.).

The communication interface 16 is designed to allow the first device 1 to transmit data to the second device 2 via the communication network 3. This communication interface 16 may be of any type (wired or wireless radio), and the communications via this communication network 3 may be governed by any communication protocol (Ethernet, Wi-Fi, Bluetooth, 3G/4G/5G cellular, etc.).

The first device 1 is typically intended for use at the entrance to a secure area, into which only authorized individuals are allowed to enter. For example, the first device 1 may form part of, or be coupled to, a gate that provides a physical barrier preventing an unauthorized individual from entering into the secure area, while allowing an authorized individual to enter. As will be seen later on, the system is used to perform biometric authentication of an individual, the purpose of this biometric authentication being, for example, to determine whether that individual is authorized (in which case they will be allowed to enter into the secure area) or unauthorized (in which case they will be denied entry to the secure area).

According to one variant (not shown), the first device 1 comprises a plurality of image sensors designed to acquire a plurality of images of an individual.

This makes it possible, for example, to have images of the individual taken from a different angle. The second device 2 is remote from the first device 1.

The second device 2 comprises a communication interface 20 with the first device 1, a processing unit 22 and a memory 24.

The communication interface 20 may be of the same type as the communication interface 16 of the first device 1.

In particular, the processing unit 22 is configured to implement the same convolutional neural network CNN mathematical function as the first device 1.

The memory 24 is intended to store a database comprising biometric templates or biometric images relating to various previously enrolled individuals.

Figure 2:
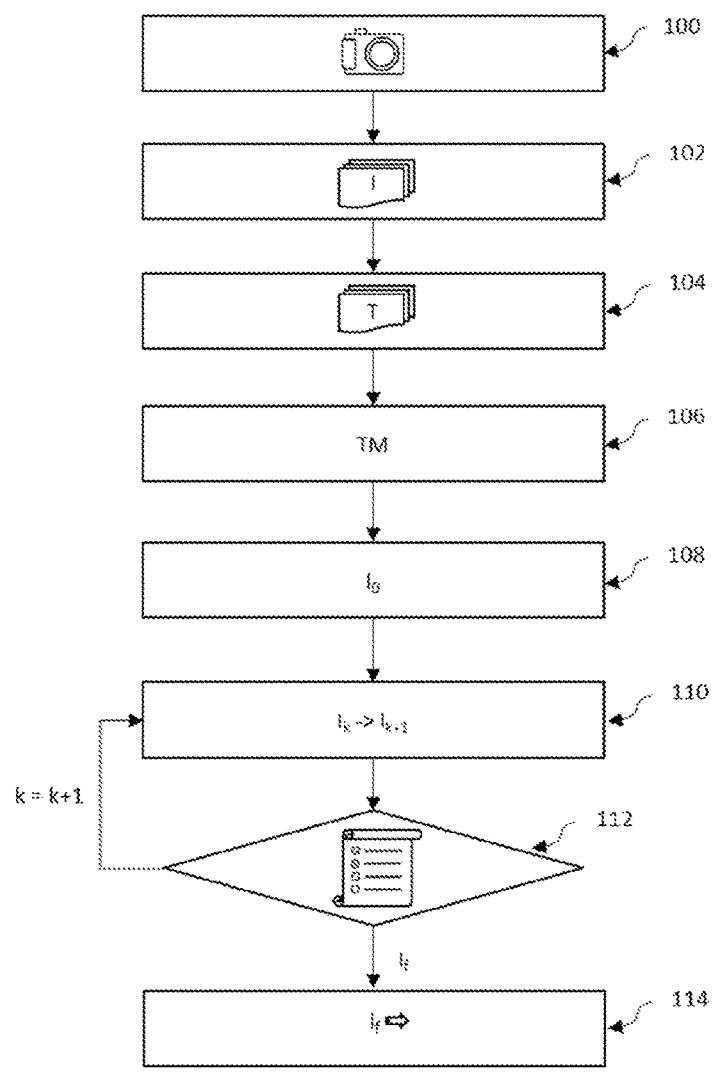
FIG. 2 is a flowchart of steps of a first method according to one embodiment of the invention.

With reference to FIG. 2, a method implementing the first device 1 comprises the following steps.

An individual comes close to the first device 1. In the following, one exemplary implementation will be considered in which an individual wishes to enter into a secure area as described above.

In an acquiring step 100, a camera acquires, for example, a sequence of images showing the individual.

Typically, the sequence of images comprises a number N of images acquired at a relatively high frequency, where N ≥ 3.

The sequence of N images is stored in the memory 14.

According to one variant, multiple sensors acquire images showing the individual. The sequence of images comprises images of the individual taken at various points in time and by various sensors. In a selecting step 102, the processing unit 12 selects from the sequence of images a plurality of images constituting a subset of images from that sequence. In other words, the plurality of images obtained from this selection comprises a number of images K such that 1 s K s N.

The plurality of images are selected 102 from the sequence of images by the processing unit 12 on the basis of an image quality criterion and on the basis of a criterion of temporal location in the sequence of images.

Figure 3:
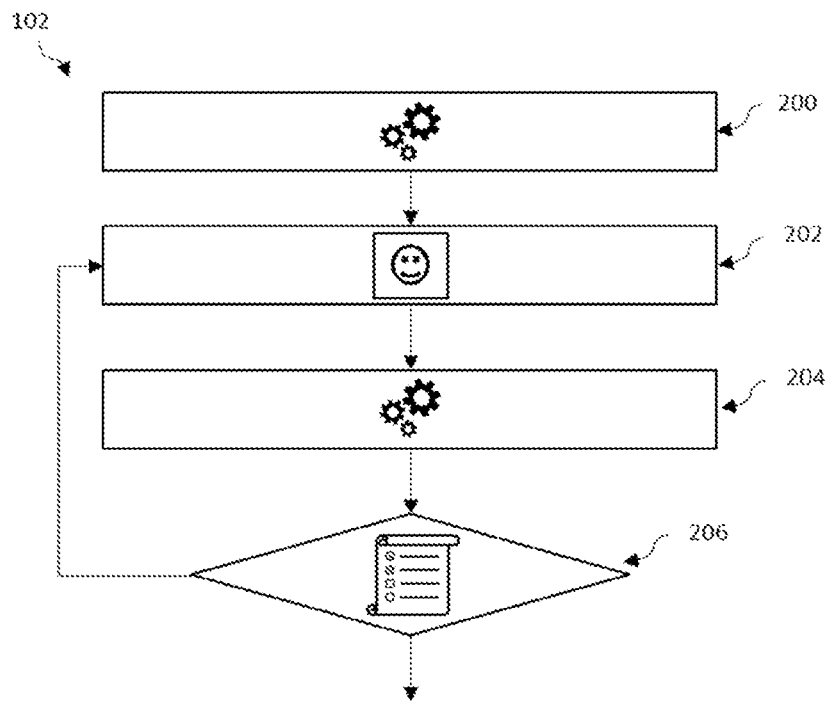
FIG. 3 details a flowchart detailing one embodiment of one of the steps shown in FIG. 2.

In one embodiment shown in FIG. 3, the selection 102 advantageously comprises the following substeps.

For each image from the sequence of images, the processing unit 12 calculates a metric associated with the image, the metric being indicative of a quality of the image (step 200). N metrics are therefore calculated in this step 200.

The calculated metric may be one of the following metrics, known to a person skilled in the art:

A metric indicative of a position of the face of an individual shown in the image: in this case, the value of the metric depends on the orientation of the face with respect to the image sensor 10; an image showing the face of the individual from the front is considered to be of better quality than an image showing the face of the individual at an angle or even in profile.

A metric indicative of the resolution of the face of the individual shown in the image: the greater the distance between the eyes of the individual, counted as the number of pixels in the image, the higher the quality of that image.

A metric indicative of a level of blur in the image: the blurrier the image, the lower the quality of that image.

A "biometric" metric, produced by a neural network different from the convolutional neural network mentioned above.

The calculated metrics are stored in the memory 16 in association with their respective images.

Next, the processing unit 12 selects that image from the image sequence which is associated with the metric indicating the best quality from the set of images from the sequence which have not yet been selected (substep 202). At this stage, this set is the sequence of images itself acquired by the image sensor 10 in its entirety; in other words, the image selected in this first implementation of substep 202 is that which has the highest quality within the image sequence. This image selected during this first implementation is called the "first image" by convention.

The processing unit 12 identifies each image from the sequence of images that is in temporal vicinity of the image selected in substep 202 (i.e. the first image). An image from the sequence is considered to be in the vicinity of the image selected in substep 202 if it is located within a time range of predefined duration comprising the selected image, for example a time range centred on that selected image. Using a concrete example to illustrate this principle: if the radius of this time range is chosen to be 500 milliseconds, those images from the sequence which are up to 500 milliseconds earlier or later than the selected image may be considered images in the vicinity of (or neighbouring) the selected image.

The processing unit 12 downgrades the metric associated with at least one of the neighbouring images (substep 204).

What is meant by "downgrading" is that the value of the metric is modified so as to decrease the quality indicated by the metric. It is understood that this downgrading only affects the calculated metric values and not the images to which these metric values relate; i.e. the images themselves are not downgraded.

Preferably, the processing unit 12 downgrades 204 the metric associated with any neighbouring image previously selected in substep 202. All of the downgrades are, for example, shifts according to the same difference in quality.

In a step 206, the processing unit 12 checks whether at least one of the following output conditions is met:
the number of implementations of substeps 202 and 204 reaches a predefined threshold Kmax;
the metric for each image from the sequence of images which has not yet been selected indicates a quality below a predefined quality threshold.

If at least one of these conditions is met, the selecting step 102 ends.

Otherwise, substeps 202, 204 and 206 are iterated as follows.

The processing unit 12 repeats substep 202 which consists in selecting an image from the image sequence which is associated with the metric indicating the best quality from the set of images from the sequence which have not yet been selected.

One difference with respect to the preceding implementation of this substep 202 is that the first image has been selected in the meantime; thus, in the second implementation of substep 202, the set of images from the sequence which have not yet been selected corresponds to the initial sequence of images excluding the first image. A second image, different from the first image, is therefore selected in this second implementation of substep 202.

Another difference with respect to the preceding implementation of this substep is that the metrics respectively associated with certain images (at least one of the images neighbouring the first image) have been downgraded in the meantime. This advantageously favours the selection of an image that is not temporally close to the first image as the second image.

The processing unit 12 repeats substep 204 which consists in downgrading the metric associated with at least one of the images neighbouring the last selected image, namely the second image. The same temporal vicinity may be used.

This embodiment of the selecting step 102 has the advantage of resulting in the obtention of a plurality of selected images which are not too close to one another in time, and therefore not very redundant, while still being of good quality.

Returning to FIG. 2, the processing unit 12 passes each selected image as input to the convolutional neural network. The processing implemented by the convolutional neural network produces on the basis of each selected image a corresponding biometric template relating to the individual shown in the image (step 104). Thus, on the basis of the K selected images, the convolutional neural network produces K associated templates in step 104.

Each biometric template is typically in the form of a vector, for example of norm 1.

The biometric templates produced by the convolutional neural network are stored in the memory 14.

In a step 106, the processing unit 12 then calculates an average template TM constituting, as its name indicates, an average of the K biometric templates produced previously. For example, the average template TM may be calculated as the sum of these K biometric templates divided by the sum of their respective norms (i.e. divided by K in the case of vectors of norm 1).

The average template TM is stored in the memory 16.

Next, the processing unit 12 chooses one of the images from among the K images that have been selected, which is called the initial image $I_0$ by convention.

The initial image $I_0$ may be any from within the K selected images on the basis of which the template TM has been calculated.

However, in one advantageous embodiment, the image associated with the biometric template that is closest to the average template TM is chosen as the initial image $I_0$. To find this image, it is sufficient to calculate each distance between the average template and one of the K biometric templates produced, to identify the biometric template $T_0$ that is at the minimum distance from the average template from among the K biometric templates produced, and then to identify the image $I_0$ that was passed as input to the convolutional neural network CNN mathematical function in order to produce the biometric template $T_0$ that is at this minimum distance ($T_0=CNN(I_0)$).

Next, the processing unit 12 implements a loop comprising one or more iterations, this loop producing a final image $I_f$ from the initial image $I_0$.

An initial iteration of this loop (by convention of index zero) will first be described, before describing in a more general manner an iteration of index k of this loop with respect to a preceding iteration of index k−1.

The initial iteration of the loop comprises a modifying step 110 in which the processing unit 12 modifies the initial image $I_0$ into a modified image $I_1$. The implemented modification 110 is designed to meet the following condition: an error $E_1$ between the average template TM and a biometric template $T_1$ produced by applying the processing to the modified image $I_1$ is smaller than an error $E_0$ between the average template TM and the biometric template $T_0$ that has been produced by applying the processing to the initial image $I_0$.

It should be noted here that this modifying step does not necessarily require the prior calculation of the biometric template $T_1$ produced by applying the processing to the modified image $I_1$ or of the error $E_I$. However, such a calculation may in practice be implemented to check whether an image modification is covered by the modification made in step 110.

Even if the biometric template $T_1$ is not calculated as such according to a step of the method, the modifying step 110 ensures that the condition regarding the errors E1, E2 is met, i.e. that the error $E_1$ between the average template TM and a biometric template $T_1$ produced by applying the processing to the modified image $I_1$ is smaller than the error $E_0$ between the average template TM and the biometric template $T_0$ that has been produced by applying the processing to the initial image $I_0$.

In one embodiment, the modification 110 of the image $I_0$ into the modified image $I_1$ is performed as follows.

The processing unit 12 calculates the following gradient:

$$D_0 = \frac{\delta E_0}{\delta I_0}$$

where $E_0$ is an error between the average template and the biometric template $T_0$ produced by applying the CNN processing to the image $I_0$ (i.e. $T_0=CNN(I_0)$).

The error $E_0$ is, for example, of the following form:

$$E_0=(T_0-TM)^2$$

Next, the processing unit 12 calculates the modified image $I_1$ by applying the following formula:

$$I_1=I_0+\lambda*D_0$$

where $\lambda$ is a predefined parameter.

This embodiment of the modifying step 110 is based on the gradient descent method, which is traditionally used to update the parameters of a neural network in a way to minimize a loss. However, in the present method, it is not the parameters of the convolutional neural network CNN mathematical function that it is sought to modify, but rather an image that has been passed as input to this convolutional neural network (in this case the image $I_0$), which is not conventional.

The initial iteration of the loop then comprises a checking step 112 in which the processing unit 12 checks whether one of the following output conditions is met.

A first condition is met when the error between the average template TM and the biometric template $T_1$ produced by applying the processing to the image $I_1$ is below a predefined threshold E, or otherwise when:

$$E_1=(T_1-TM)^2<E$$

Thus, in order to know whether this first condition is met, the processing unit 12 calculates $T_1=CNN(I_1)$, when this calculation has not already been performed in the step of modifying the image $I_0$ into the modified image $I_1$ (in particular, this calculation is not performed in the embodiment described above based on the gradient descent method).

A second condition is met when the number of iterations of the modifying step 110 implemented reaches a predefined threshold. At this stage, the modifying step has only been implemented once.

If the first condition is met or if the second condition is met, then the loop ends. The final image $I_f$ is then the modified image $I_1$.

Otherwise, a new iteration of the loop (of index 1) is implemented, this new iteration taking as input the image $I_1$ instead of the initial image $I_0$.

Consider more generally an iteration of index k of the loop, where k≥0. This iteration of index k applies to the image $I_k$, obtained in a preceding iteration of index k−1, the modification of step 110 described above, so as to obtain a new modified image $I_{k+1}$.

In the embodiment described above inspired by the gradient descent method, there is thus at the iteration of index k:

$$I_{k+1} = I_k - \lambda * D_k$$

where:

$$D_k = \frac{\delta E_k}{\delta I_k}$$

$$E_k = (T_k - TM)^2$$

The modification 110 implemented in the iteration of index k is designed so that the error Eko between the average template TM and the biometric template Tko produced by applying the processing to the modified image $I_{k+1}$ is smaller than the error $E_k$ between the average template and the biometric template that has been produced by applying the processing to the image $I_k$.

The final image $I_f$ obtained as output from the loop is the modified image produced in the last implementation of the modifying step 110. As mentioned above, the final image $I_f$ may very well be the image $I_1$ (in the case where only one iteration of the loop was sufficient to result in the first condition or the second condition being met), or it may be an image resulting from one or more successive modifications of this image $I_1$ (in the case where multiple iterations of the loop had to be run in order to meet the first condition or the second condition).

The final image $I_f$ is then transmitted to the second device 2 via the communication interface (step 114).

The final image $I_f$ has two advantages: it is a small item of data whose transmission 114 consumes little bandwidth on the communication network 3 while combining visual information from the K images selected from the video sequence. This final image $I_f$ is less likely to be noisy than one of the original images in the acquired sequence of images.

Figure 4:
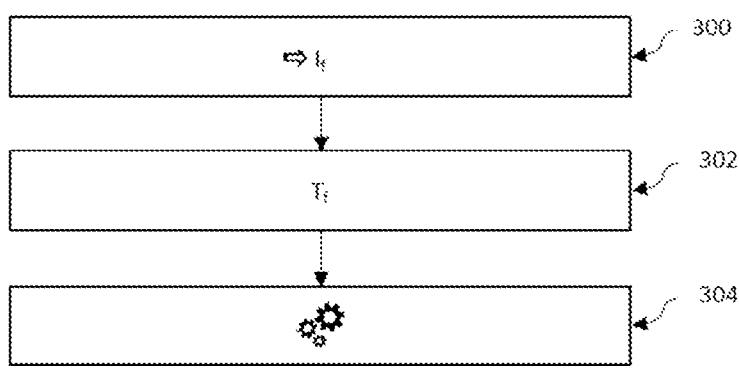
FIG. 4 is a flowchart of steps of a second method according to one embodiment of the invention.

With reference to FIG. 4, the second device 2 implements a method comprising the following steps.

The second device 2 receives the final image $I_f$ via its communication interface (step 300).

The processing unit 22 of the second device 2 passes the final image $I_f$ as input to the same convolutional neural network CNN mathematical function as implemented by the first device 1 (step 302). In other words, the processing implemented in step 302 on the side of the second device 2 is identical to each processing operation implemented in step 104 on the side of the first device 1. From the final image $I_f$, the convolutional neural network produces, in step 302, a biometric template $T_f$=CNN($I_f$), which is called the "final" biometric template by convention.

The processing unit 12 may then compare the final biometric template $T_f$ with the reference templates stored in the memory database 24, in order to determine whether the final biometric template $T_f$ matches any of them.

If so, this means that the individual has been previously enrolled in the database; the individual is therefore an authorized user, and is granted authorization to access the secure area (positive authentication result).

If not, this means that the individual is not an authorized user and is denied access to the secure area (negative authentication result).

Because of the way the final image $I_f$ has been produced, the final biometric template $T_f$ is close to the average template TM. This closeness allows the second device 2 to implement matches that are still reliable. Thus, two objectives have been achieved: the biometric authentication performed consumes little bandwidth on the communication network 3 between the first device 1 and the second device 2 (just one information-rich image is transmitted over this network), and this is achieved without compromising the proper functioning of the template-matching operation.

The method implemented by the first device 1 may also be combined with a method implemented by the second device 2 in order to enrol the individual in the database in the memory 24 (in which case the comparing/matching step is simply replaced with storing the final template $T_f$ and/or the final image $I_f$ in the database).

Of course, the methods described above with reference to the appended figures are only non-limiting embodiments. These methods may be subject to variants.

Although advantageous, the use of a convolutional neural network to produce biometric templates from images is not necessary. Other processing operations may be implemented to produce biometric templates from images.

It is further understood that the acquiring 100 and selecting 102 steps are optional preliminary steps for obtaining the final image $I_f$. The selecting step 102 is optional, and the plurality of K images on the basis of which the final image is obtained do not necessarily come from a sequence of images acquired by an image sensor 10.

The invention claimed is:

1. A computer-implemented method, comprising:
processing, for each image of a plurality of images showing an individual, the image to produce a biometric template relating to the individual;
calculating an average biometric template constituting an average of the biometric templates produced; and
modifying a chosen image from the plurality of images to generate a modified image, wherein
a first error between the average biometric template and a first biometric template, the first biometric template being produced by applying the processing to the modified image, is smaller than a second error between the average biometric template and a second biometric template, the second biometric template being produced by applying the processing to the chosen image.

2. The computer-implemented method according to claim 1, wherein the chosen image is such that the biometric template produced by application of the processing to the chosen image is the closest to the average biometric template from among the biometric templates produced.

3. The computer-implemented method according to claim 1, wherein the modifying step is iterated until at least one of the following conditions is met:
an iteration of the modifying step has produced a final image such that an error between the average biometric template and a final biometric template, the final biometric template being produced by applying the processing to the final image, is below a predefined threshold; or
a number of iterations of the modifying step has reached a predefined threshold.

4. The computer-implemented method according to claim 1, wherein the modifying step is iterated as follows:

$$I_{k+1}=I_k-\lambda*D_k$$

where:
$I_k$ is an image to be modified by a kth iteration of the modifying step;
$I_{k+1}$ is a modified image produced by the kth iteration;
$\lambda$ is a predefined parameter; and $$D_k = \frac{\delta E_k}{\delta I_k},$$

where $E_k$ is an error between the average biometric template and a biometric template produced by applying the processing to the image $I_k$.

5. The computer-implemented method according to claim 1, wherein the processing is implemented by a convolutional neural network.

6. The computer-implemented method according to claim 1, further comprising:
selecting the plurality of images from a sequence of images, the selection being made on the basis of an image quality criterion and on the basis of a criterion of temporal location in the sequence of images.

7. The computer-implemented method according to claim 6, wherein the selection comprises:

a) for each image from the sequence of images, calculating an associated metric indicative of a quality of the image;
b) selecting an image from the sequence of images whose associated metric indicates a best quality from a set of images from the sequence which have not been selected;
c) for at least one image from the sequence of images other than the selected image that is located in a predefined temporal vicinity of the selected image, downgrading the metric associated with the at least one image; and
d) repeating steps b) and c) until at least one of the following conditions is met:
a number of implementations of step b) has reached a predefined threshold; or
the associated metric for each image from the sequence of images which have not been selected has crossed a predefined quality threshold.

8. The computer-implemented method according to claim 1, wherein the method is implemented by a first device, the method further comprising
transmitting, in a communication network and to a second device, a final image originating from the modified image, the second device being configured to apply the processing to the final image so as to produce a final biometric template relating to the individual.

9. A computer-readable memory storing instructions that are executable by the computer in order to carry out the steps of the method according to claim 1.

10. A device comprising:
a sensor configured to acquire a plurality of images showing an individual, and at least one processor configured to:
for each image of the plurality of images, apply processing to the image se as to produce a biometric template relating to the individual;
calculate an average biometric template constituting an average of the biometric templates produced; and
modify a chosen image from the plurality of images to generate a modified image,
wherein a first error between the average biometric template and a first biometric template, the first biometric template being produced by applying the processing to the modified image is smaller than a second error between the average biometric template and a second biometric template, the second biometric template being produced by applying the processing to the chosen image.

* * * * *